UNITED STATES PATENT OFFICE.

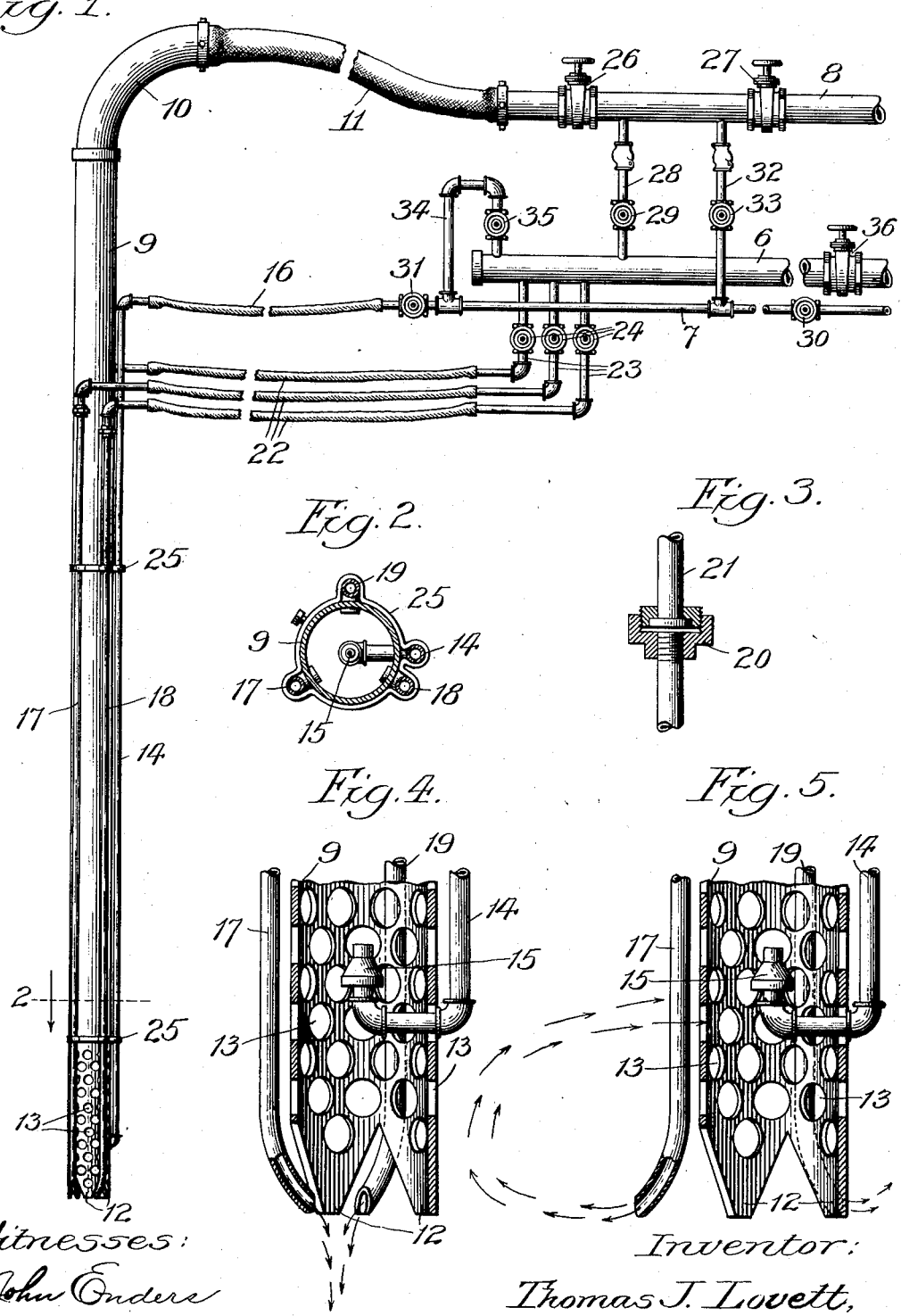

THOMAS J. LOVETT, OF CHICAGO, ILLINOIS, ASSIGNOR TO BLACK SAND AND GOLD RECOVERY COMPANY, OF CHICAGO, ILLINOIS, A CORPORATION OF ARIZONA TERRITORY.

PIPE-DREDGE.

967,797.  Specification of Letters Patent.  Patented Aug. 16, 1910.

Application filed October 4, 1909. Serial No. 520,791.

*To all whom it may concern:*

Be it known that I, THOMAS J. LOVETT, a citizen of the United States, residing at Chicago, in the county of Cook and State of Illinois, have invented a new and useful Improvement in Pipe-Dredges, of which the following is a specification.

This invention relates to improvement in hydro-pneumatic dredges employing a dredging-pipe, means for directing fluid under pressure into the lower end of the pipe to operate as a lifting-jet, and means for producing a water-jet, or a plurality of such jets, at the lower end of the pipe to aid the lifting-jet in gathering the material to be dredged and forcing it upward through the dredging-pipe.

My object is to provide certain improvements in the so-called "pipe-dredge," described, with a view to simplifying its construction and improving its operation.

A further object is to provide certain improvements in details to facilitate the operations, as in mining for example, of opening a path for the dredge-pipe down to bed rock and gathering in and raising values therefrom.

In the drawing—Figure 1, is a broken diagrammatic view of so much of a pipe-dredge plant as is thought necessary to illustrate in the present connection, and showing the dredging-pipe, water and air-supply pipes and controlling valves; Fig. 2, an enlarged section taken on line 2 in Fig. 1; Fig. 3, a broken sectional view, illustrating the pivotal connections at the upper ends of the water-jet pipes; and Figs. 4 and 5, enlarged broken and vertical sections of the lower end-portion of the dredging-pipe, the views illustrating, respectively, the two different positions of the water-jet pipes.

The entire dredging plant may be mounted upon a barge, or any other fixed or movable support.

6, is a water main connected with a water-supplying pump; 7, a pipe connected with an air-compressor, and, 8, a discharge-pipe for the dredged material.

The dredging-pipe, 9, may be of any suitable length, either in one piece or in sections joined together. At the top of the pipe, 9, is an elbow, 10, connected through the medium of a flexible-pipe, 11, with the discharge-pipe, 8. The lower end of the pipe, 9, is serrated to form say three tapering projections, 12, as indicated; and the lower end or foot-portion of the pipe is provided with a plurality of perforations, 13, of any desired number and any desired shape forming a grizzly.

Extending longitudinally of and closely adjacent to the pipe, 9, is an air-jet pipe, 14, extending into the perforated foot-portion of the pipe, 9, and having an upturned discharge-nozzle, 15, at the center of the pipe, 9. At its upper end the pipe, 14, is connected by a flexible hose, 16, with the air-supply pipe, 7. Also extending close to and parallel with the pipe, 9, are three water-jet pipes, 17, 18, and, 19, curved at their lower ends, as indicated. The upper ends of the water-jet pipes carry collars or union members, 20, having hexagonal faces, whereby the water-jet pipes may be turned on their axes by means of a wrench. At the said collars the water-jet pipes are swiveled to coupling-pipes, 21, connected by means of flexible hose sections, 22, with separate coupling-pipes, 23, communicating with the water-supply main, 6, and having valves, 24. The water-jet and air, or lifting-jet pipes are held to the dredging-pipe, 9, by collars, 25, the collars also forming bearings in which the water-jet pipes may turn.

Interposed in the pipe, 8, are valves, 26, and, 27. A pipe, 28, extends from the water main to the pipe, 8, between the said valves, and is itself provided with a valve, 29. The air-supply pipe, 7, is provided with the valves, 30, 31. Extending from the pipe, 7, to the pipe, 8, is a connecting-pipe, 32, provided with a valve, 33; and extending from the pipe, 7, to the pipe, 6, is a pipe, 34, provided with a valve, 35. The water-supply pipe, 6, has a valve, 36.

In operation, the dredging-pipe, 9, and attendant pipes are lowered into the ground to be dredged, this movement being permitted by the flexible connections 11, 16, 22. The water-jet pipes are turned on their axes to adjust their bent lower ends into register with the openings between the serrations, 12. The valves, 24, being opened will cause water under pressure to be forced through the water-jet pipes, and play in a solid stream downward to open a path for the descent of the dredging-pipe. When the latter reaches a proper depth the water-jet pipes are turned on their axes to direct the bent lower ends in the outward direction, as shown in Fig. 5. The valves 30, 31, are opened to cause air under pressure to play upward in the dredging-pipe and form a lifting-jet to raise and force the material entering through the openings, 13, into and through the discharge-pipe, 8. The various valves are provided for different contingencies. For example, if the dredging-pipe should be gripped by surrounding material in such a way as to prevent its being lifted by the raising and lowering means with which it is equipped, the valve, 26, may be closed while the air-jet and water-jet pipes are open, causing all the pressure thereof to be exerted in the direction of raising the dredging-pipe. Furthermore, the escape of air under pressure from the lower end of the dredging-pipe, up and around the latter, when the valve, 26, is closed, tends to free the dredging-pipe from the surrounding material and permit it to be raised. If it is desired to clean the dredging-pipe, the valve, 27, may be closed, the valve, 26, opened, and water or air, or both, directed by means of the pipes, 28, 32, into the dredging-pipe. If it is desired to clean the discharge-pipe, the valve, 26, may be closed, the valve, 27, opened, and water or air and water, directed into the pipe, 8. All the other valves have their uses for the purpose of turning on or shutting off air or water, as demanded by the operations.

The water-jet pipes, when turned to the position shown in Fig. 4, offer no material obstruction at their lower ends to the descent of the pipe-dredge, and besides, as before stated, cause a single heavy jet of water to play against the material which has to be displaced for the descent of the pipe. When the water-jet pipes are turned to the position shown in Fig. 5, they play outward, forming a whirl of the material to be excavated, and driving it into the foot-portion of the pipe, where it is engaged and discharged by the air-lift.

In mining at bed rock, the streams from the water-jet pipes may be caused to play with great force over the bed rock, sweeping up the values and insuring their being gathered in and discharged. For mining operations, the pipe, 8, would discharge into a sluice-box, or other gold-saving appliance.

What I claim as new and desire to secure by Letters Patent, is—

1. In a pipe-dredge, the combination with a dredging-pipe having a foot-portion provided with openings and an upturned lifting-jet pipe in said foot-portion, of a water-jet pipe extending adjacent to said foot-portion and having a bend toward its lower end, and rotatable on its axis to direct a water-jet to different angles with relation to the dredging-pipe, for the purpose set forth.

2. In a pipe-dredge, the combination with a dredging-pipe having a foot-portion provided with openings and an upturned lifting-jet pipe in said foot-portion, of a plurality of water-jet pipes extending adjacent to said foot-portion each having a bend toward its lower end, and being rotatable on its axis to direct a water-jet to different angles with relation to the dredging-pipe, for the purpose set forth.

3. In a pipe-dredge, the combination of a dredging-pipe having a foot-portion provided with a plurality of openings, an upturned lifting-jet pipe in said foot-portion, and a plurality of water-jet pipes extending adjacent to said foot-portion each having a bend toward its lower end, the water-jet pipes being rotatably mounted whereby they may be turned into register with openings in the said foot-portion, to jet in the direction of each other or may be turned to jet in directions away from each other, for the purpose set forth.

THOMAS J. LOVETT.

In the presence of—
R. SCHAEFER,
J. G. ANDERSON.